United States Patent

Speich

[11] Patent Number: 5,948,208
[45] Date of Patent: Sep. 7, 1999

[54] ULTRASONIC DEVICE FOR CUTTING A FUSIBLE TEXTILE WEB AND AT THE SAME TIME HEAT-SEALING THE CUT EDGES

[75] Inventor: Francisco Speich, Gipf-Oberfrick, Switzerland

[73] Assignee: Textilma AG, Hergiswil, Switzerland

[21] Appl. No.: 08/983,238

[22] PCT Filed: May 8, 1996

[86] PCT No.: PCT/CH96/00177

§ 371 Date: Jan. 12, 1998

§ 102(e) Date: Jan. 12, 1998

[87] PCT Pub. No.: WO97/03241

PCT Pub. Date: Jan. 30, 1997

[30] Foreign Application Priority Data

Jul. 11, 1995 [DE] Germany ........................ 295 11 224 U

[51] Int. Cl.[6] ............................... D06H 7/22; B26D 7/08
[52] U.S. Cl. ....................... 156/580.2; 156/73.3; 156/515
[58] Field of Search .................... 156/73.1, 73.3, 156/510, 515, 530, 580.1, 580.2

[56] References Cited

U.S. PATENT DOCUMENTS

| | | | |
|---|---|---|---|
| 3,555,945 | 1/1971 | Warthen | 83/56 |
| 4,400,227 | 8/1983 | Riemersma | 156/73.1 |
| 4,404,052 | 9/1983 | Persson et al. | 156/73.1 |
| 5,317,943 | 6/1994 | Dowdle | 83/56 |

FOREIGN PATENT DOCUMENTS

| | | |
|---|---|---|
| 0532865 | 3/1993 | European Pat. Off. . |
| 0534300 | 3/1993 | European Pat. Off. . |
| 3525400 | 6/1986 | Germany . |
| 3529686 | 2/1987 | Germany . |
| 3626426 | 2/1987 | Germany . |
| 4100344 | 7/1992 | Germany . |
| 4138837 | 3/1993 | Germany . |
| 4303092 | 8/1994 | Germany . |
| 9418373 | 8/1994 | WIPO . |

OTHER PUBLICATIONS

Patent Abstracts of Japan, vol. 018, No. 174, (E–1530), Mar. 24, 1994 & JP A 05 343 833 (Fujitsu Ltd), Dec. 24, 1993.

*Primary Examiner*—James Sells
*Attorney, Agent, or Firm*—Friedrich Kueffner

[57] ABSTRACT

An ultrasonic device for cutting a meltable or fusible textile web and simultaneously welding or heat-sealing the cut edges is provided. A cutting knife works together with an anvil by means of a wedge-shaped cutter. The cutting knife or the anvil is connected with an ultrasonic transmitter. The cutting knife varies in cross section along the length of the cutter. The cutting knife and/or the anvil are/is adjustable in such a way that, in each case, the cross section of the cutting knife which is suitable for a determined thickness of the textile web is used.

17 Claims, 3 Drawing Sheets

ULTRASONIC DEVICE FOR CUTTING A FUSIBLE TEXTILE WEB AND AT THE SAME TIME HEAT-SEALING THE CUT EDGES

FIELD OF THE INVENTION

The invention is directed to an ultrasonic device for cutting a meltable or fusible textile web and simultaneously welding or heat-sealing the cut edges.

BACKGROUND OF THE INVENTION

A number of ultrasonic devices of the type mentioned above are known, for example, from WO 94/18373, EP-A-0 534 300 and DE-A-35 24 400. All of these ultrasonic devices have in common that they cannot be adjusted to changing thicknesses of the textile webs to be cut and therefore offer results ranging from poor to unusable, especially when cutting label ribbons from a run or web of woven fabric.

EP-A-0 532 865 attempts to overcome the above-mentioned deficiencies in that a precompressor is arranged in front of the cutting knife, this precompressor working together with the ultrasonic transmitter in order that thicker portions of the textile web to be cut are thinned out prior to cutting. However, the precompressor has proven difficult to adjust, so that the precompression is either insufficient or the precompressor already severs the textile web.

SUMMARY OF THE INVENTION

The object of the invention is to develop an ultrasonic device of the type mentioned at the start such that it is possible for textile webs of varying thickness to be cut with ease.

According to the invention, an ultrasonic device can be optimally adjusted to the textile web to be severed in that the cutting knife varies in cross section along the length of the cutter, wherein, in each case, only that cross section which is suitable for a determined thickness of the textile web is used. In this connection, an adjustment of the kind mentioned above can be a basic setting to a textile web to be cut if this textile web has a constant thickness along its entire length. But it is substantially more advantageous to use the ultrasonic device in a textile web having a constantly changing thickness as a result of different patterning, such as is the case in label ribbons in particular. In this case, the ultrasonic device can be directly adjusted to the thickness of the portion of the textile web to be cut. Such an adjustment can be carried out either by means of a feeler which is arranged in advance of the cutting knife or directly on the basis of the control program for producing the textile web, which control program is actually responsible for the patterning of the textile web to be produced.

Therefore, by means of the new ultrasonic device, textile webs can be cut flawlessly regardless of whether they have very thin or thick portions. The resulting cut edges are resistant to rippling and free from brows or discoloration. In spite of favorable strength, they are highly flexible and have a soft texture that is not irritating to skin. However, the ultrasonic device not only provides good characteristics for the textile web to be cut, but also simultaneously improves its own durability, especially with respect to the cutting knife and anvil. Accordingly, the efficiency of the ultrasonic device overall is also improved and the cost-performance ratio is also improved overall.

The ultrasonic device is suitable for the cutting and heat-sealing of a wide variety of textile webs, including knitted layers, knits and wovens. This results in advantages even when the textile web has a uniform thickness over its entire length because the ultrasonic device can be adjusted in a simple manner to any textile web thickness to be produced. However, as was already mentioned, the ultrasonic device proves especially advantageous in the production of textile webs having a constantly changing patterning, and thus changing thickness, along the length. This is the case, in particular, when a plurality of label ribbons are initially woven so as to adjoin one another in a broad woven fabric and the broad woven fabric must then be cut into individual label ribbons. In this connection, the ultrasonic device can be used independent from the device producing the textile web. However, it is more advantageous if the ultrasonic device is arranged directly at the devices serving to produce the textile web, particularly at a weaving machine.

Particularly advantageous embodiment examples of the invention are described in the claims.

First, while it is certainly possible to connect the ultrasonic transmitter with the anvil and have it work against the cutting knife, it is more advantageous to connect the cutting knife with the ultrasonic transmitter and have it work against the anvil. But it is equally possible to provide both the cutting knife and the anvil with an ultrasonic transmitter.

According to an aspect of the invention, the cutter can have curved lateral surfaces as viewed over the cross section, but a construction according to another aspect of the invention with straight lateral surfaces is more advantageous.

In accordance with an aspect of the invention, it is possible for the cutter to have a sharp-edged cutting edge, but a configuration according to another aspect of the invention is more advantageous because the blunted cut edge not only prolongs the service life of the cutting knife and anvil, but also provides advantageous characteristics for the cut itself because the melted textile material displaced by the wide cutting edge can be used to strengthen the cut edges.

A construction according to another aspect of the invention is especially advantageous because the smaller wedge angle makes it easier for the cutting knife to penetrate through the textile web in the case of a thicker textile web portion. In the case of a thinner textile web, however, a large wedge angle of the cutter is advantageous, in that this large wedge angle combines faster penetration of the textile web with a broader support on the textile webs, so that excessively fast penetration is prevented on the one hand and, at the same time, a broader edge is accessed for heat-sealing. In this way, the reduced heat-sealing in a thin textile web by reason of thinness is offset by a broader heat-sealing edge.

It is principally possible in accordance with another aspect of the invention to use a cutting knife with a straight cutting edge, wherein, in this case, the anvil is advantageously constructed in a curved manner in order to ensure that the textile web can slide through without becoming entangled. In order to use different areas of the cutting knife, the cutting knife can either be moved back and forth in the direction of the cutting edge relative to the anvil or the cutting knife is arranged so as to be stationary and the anvil is moved back and forth along the cutting edge. A construction according to another aspect of the invention is more advantageous, wherein the anvil can be constructed so as to be unchanged with respect to position. According to another aspect of the invention, however, the anvil can advantageously be constructed as a rotatable cylinder which is rotated by means of the textile web that is guided over it. An anvil of this kind has the advantage that influence is distributed over a larger area, that is, the circumferential surface of the cylinder, so that the life of the anvil can be substantially prolonged. Further, this solution offers a more careful treatment of the textile web, since this textile web need not rub along a stationary surface during the cutting and heat-sealing.

According to another aspect of the invention, the cutting knife and/or the anvil can be provided with an ultrasonic transmitter.

If a plurality of ultrasonic devices are employed simultaneously, the further development according to another aspect of the invention is particularly advantageous in that a plurality of ultrasonic devices are arranged along the bar and controlled simultaneously.

According to another aspect of the invention, there are advantageous steps, already mentioned above, for adjusting the cutting knife to changing thicknesses of a moving textile web.

According to another aspect of the invention, there is an especially advantageous application of the ultrasonic device, namely, to a weaving machine for producing label ribbons from a broad woven fabric. A cut of the greatest possible accuracy results by cutting on the weaving machine in the region between the spreader and the fabric take-off device in which the broad woven fabric web is still guided by the reed. In this respect, especially advantageous results are achieved when the ultrasonic device according to another aspect of the invention is arranged in front of a heat-setting device or thermofixing device of the weaving machine which compensates for the tensions resulting in the label ribbon to be produced during the cutting and heat-sealing of the cut edges. The ultrasonic device is advantageously arranged in front of the fabric take-off device according to another aspect of the invention.

BRIEF DESCRIPTION OF THE DRAWINGS

Embodiment examples of the subject matter of the invention are described more fully hereinafter with reference to the drawings.

DESCRIPTION OF THE PREFERRED EMBODIMENTS

FIGS. 1 to 8 describe an ultrasonic device 2 in connection with the production of label ribbons 4 from a broad woven fabric 6 on a weaving machine 8.

Figure 7:
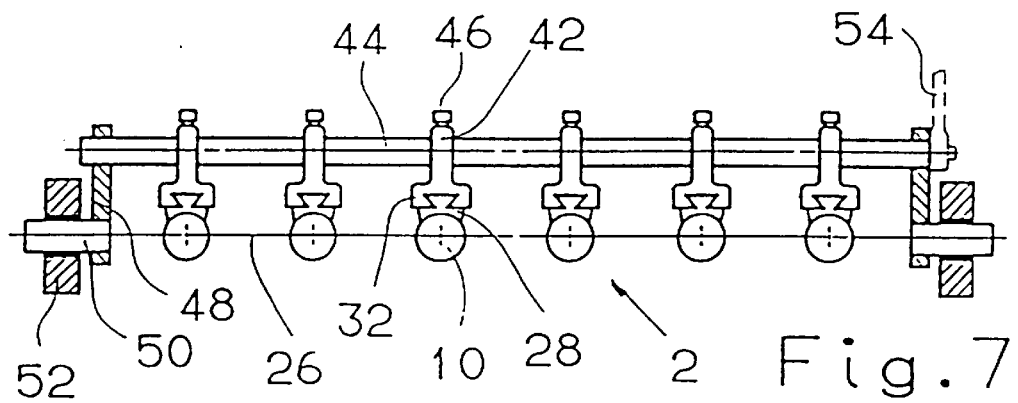
FIG. 7 is a top view showing the arrangement of a plurality of ultrasonic devices at the weaving machine according to FIG. 6.

The ultrasonic devices 2 have an ultrasonic transmitter 10, at whose front end is arranged a cutting knife 12 which cooperates with an anvil 14 which, in the present example, is constructed as a first deflecting roller or guide pulley 16 of a fabric take-off device 18. The cutting knife 12 contains a wedge-shaped cutter 22 of varying cross section a, b, c. The cutting edge 24 is curved and forms a segment of a circle with radius R around the center axis 26. The ultrasonic transmitter 10 is arranged with its cutting knife 12 at a carriage or slide 28 which is guided in a holder 32 so as to be displaceable in the feed direction 30. The holder has an angled part 34 at which is arranged a pretensioning device 36 which, in the present example, is formed by a helical spring 38 which is adjustable with respect to pretensioning force by means of a screw 40. Other means, especially pneumatic means, can also be provided instead of the screw for pretensioning the cutting knife 12 relative to the anvil 14. The holder is arranged at a bar 44 by means of a bearing block 42 and is fixed by a screw 46. The bar 44, at which a plurality of ultrasonic devices 2 can be arranged according to FIG. 7, is fastened at the ends to arms 48 which are, in turn, supported in the frame 52 by pins 50 so as to be swivelable. The arrangement is carried out in such a way that the pins 50 coincide with the center axis 26 so as to ensure the required swiveling movement about the center axis. An actuating motor or adjusting motor 56 which is connected with a control mechanism 60 via a line 58 is connected via a bar 54 for swiveling the ultrasonic device 2. The control mechanism 60 controls the adjusting motor either on the basis of a control program for producing the label ribbons or on the basis of a thickness signal for the sensed broad woven fabric 6 which is supplied by a feeler 62 via line 64.

Figure 1:
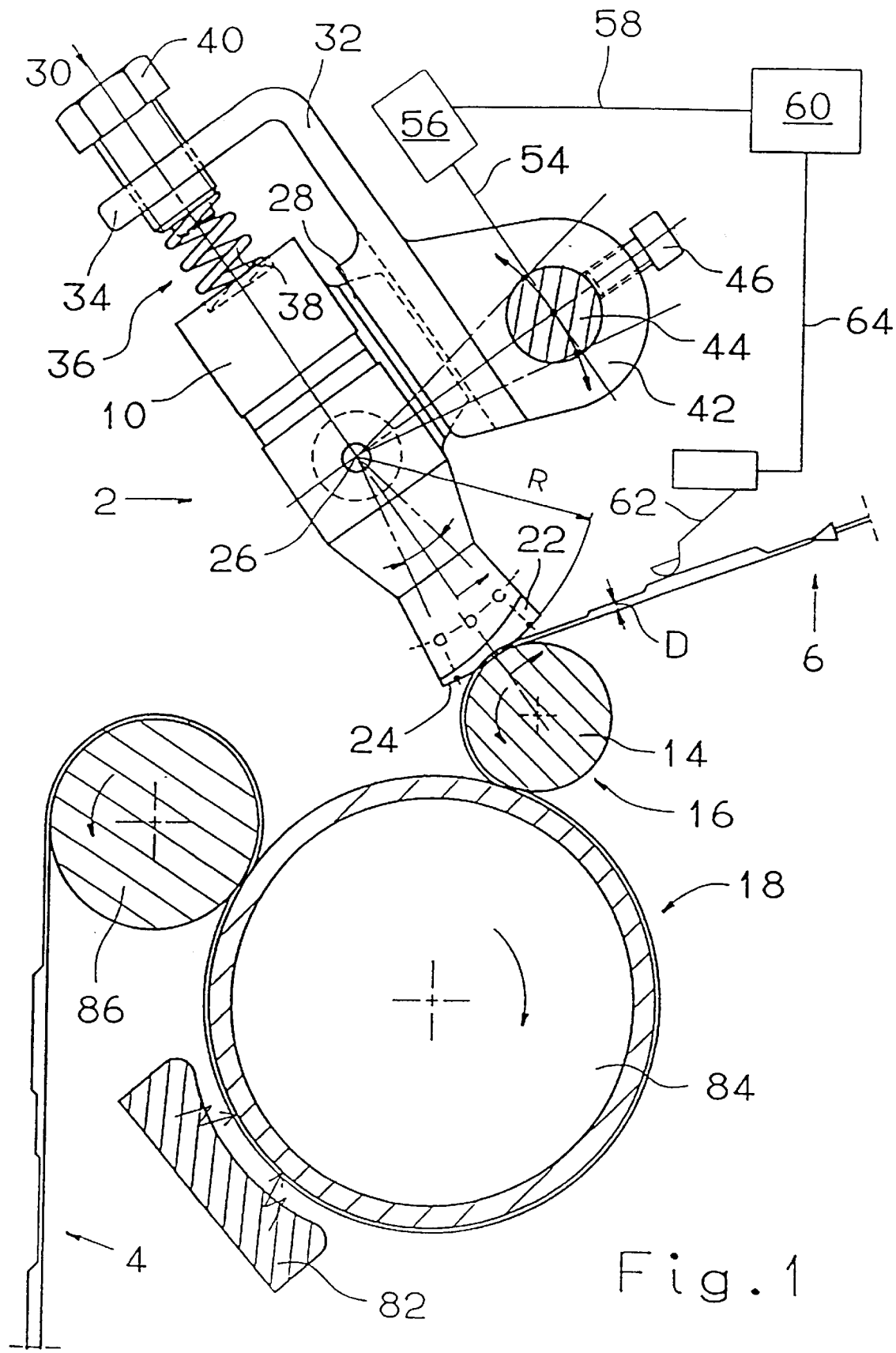
FIG. 1 is a side view of an ultrasonic device at a fabric take-off device.
Figure 2:
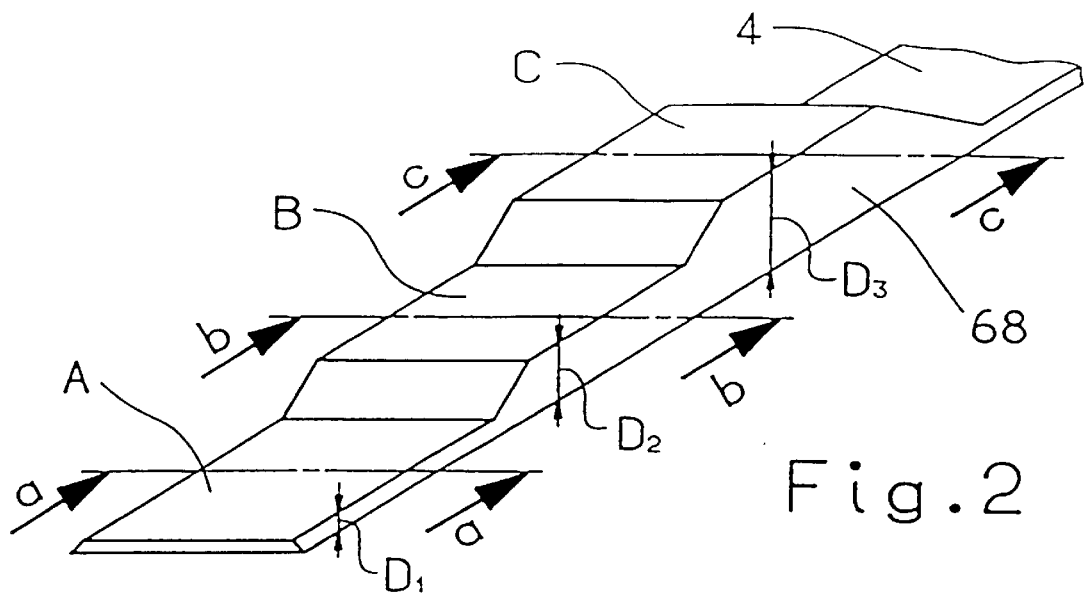
FIG. 2 shows a label ribbon in section and in a diagrammatic view to illustrate the fluctuating thickness ratios.
Figures 3, 4:
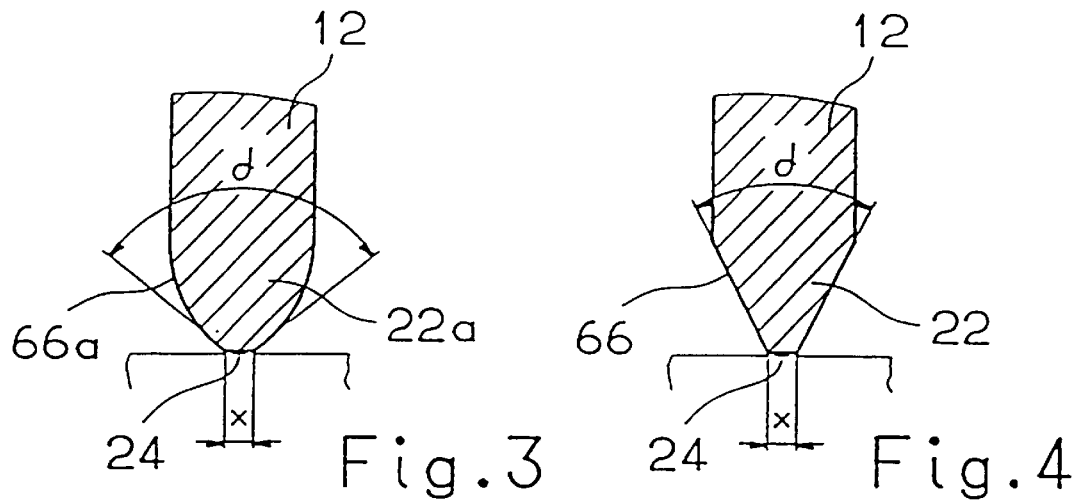
FIG. 3 shows a cutting knife with curved lateral surfaces in cross section.
FIG. 4 shows a cutting knife with straight lateral surfaces in cross section.
Figure 5:
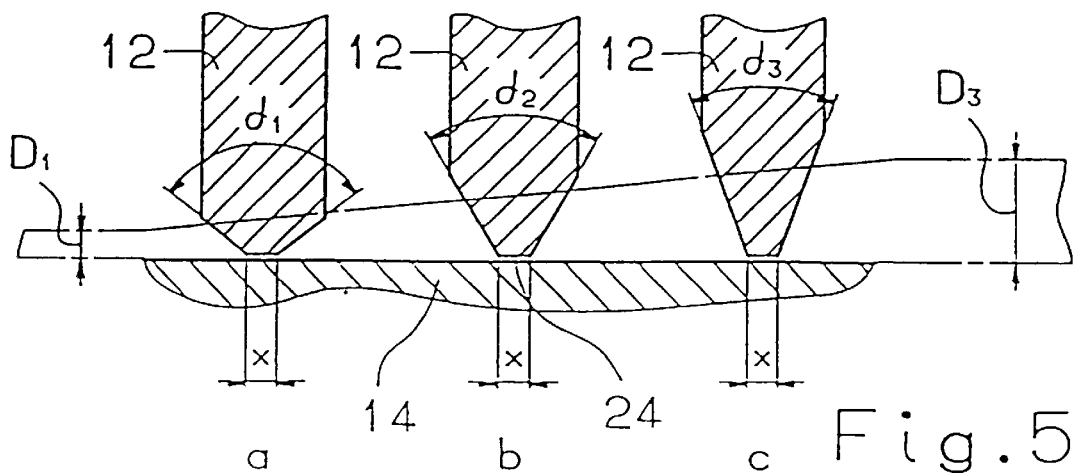
FIG. 5 shows the allocation of a determined cross section to a determined thickness of the textile web.

As was already mentioned, the cutting knife 12 has a wedge-shaped cross section, wherein the lateral surfaces 66 can be straight according to FIG. 4 or can be curved lateral surfaces 66a according to FIG. 3. In the present example, the cutting edge 24 is not sharp, but rather is preferably blunt and has width x which is preferably constant over the entire length of the cutting edge 24. The cutting knife 12 varies in cross section a, b, c over the entire length of the cutting edge in that the wedge angle α preferably changes between 0° and 160°. As can be seen from FIGS. 1, 2 and 5, a determined wedge angle $\alpha_1$ to $\alpha_3$ is associated with a determined thickness $D_1$ to $D_3$ of the broad woven fabric 6 or of the label ribbon 4, specifically in such a way that in the case of a thin portion A of the broad woven fabric 6 the cutting knife occupies the position in which it has a relatively large wedge angle $\alpha_1$. As the thickness $D_2$, $D_3$ of the regions B and C of the broad woven fabric 6 increases, the wedge angle decreases from $\alpha_2$ to $\alpha_3$, so that the wedge angle α decreases as the woven fabric becomes thicker. A label ribbon 4 with cut edge 68 is formed by means of cutting.

Figure 6:
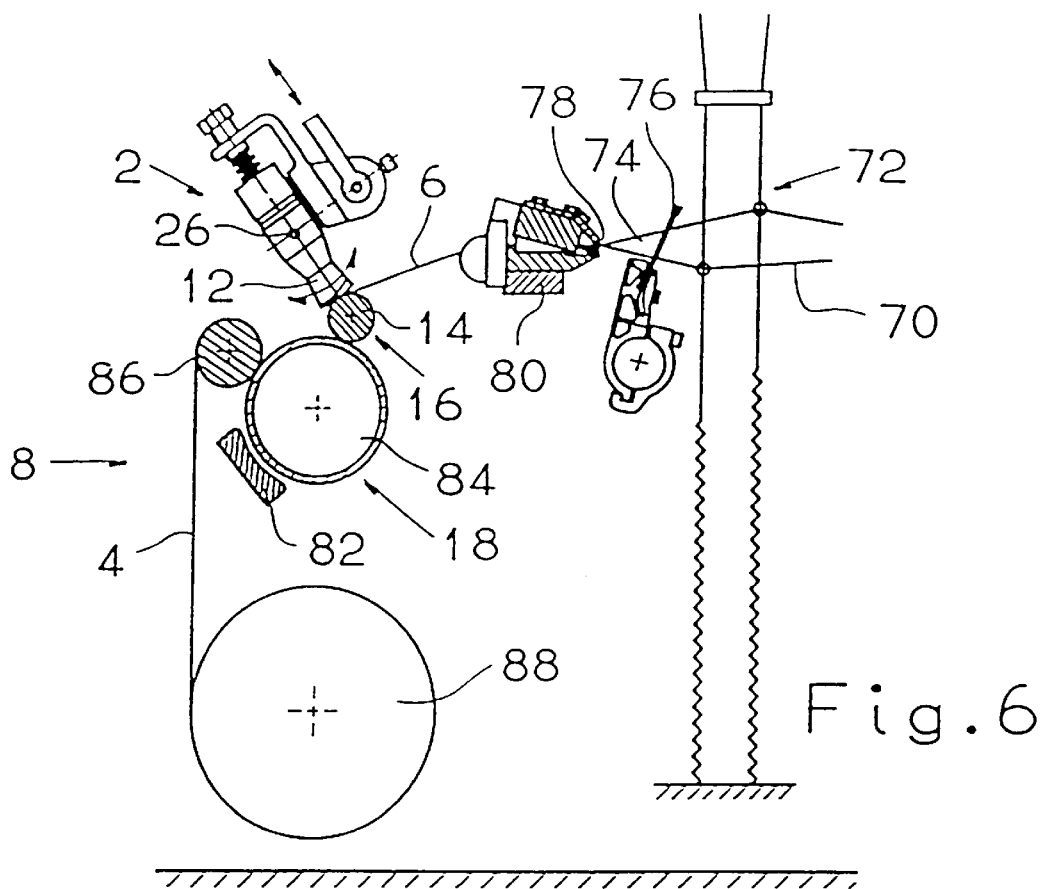
FIG. 6 is a schematic side view of a weaving machine for producing label ribbons.

FIG. 6 in particular shows the arrangement of the ultrasonic device 2 at a weaving machine of conventional construction. Warp threads 70 are opened to form a shed 74 by the shedding mechanism 72 according to pattern. In a manner that is not shown more fully, a weft thread is introduced into the shed 74 and beat up by a weaving reed 76 at the edge 78 of the textile fabric. The broad woven fabric that is produced is guided over a spreader 80 to the fabric take-off device 18. The first guide pulley 18 of the fabric take-off device also serves simultaneously as an anvil 14 for the ultrasonic device 2 by means of which the arriving broad woven fabric 6 is cut into individual label ribbons 4. The label ribbons 4 are guided around a drum 84 of the fabric take-off device 18, at which a thermofixing device 82 is also arranged, so that the label ribbons which are still tensioned longitudinally and undergo internal stresses due to the cutting and heat-sealing process can be rendered free of stresses. Following the drum 84, the label ribbons run over an additional guide pulley 86 to a take-up roll 88.

Figure 8:
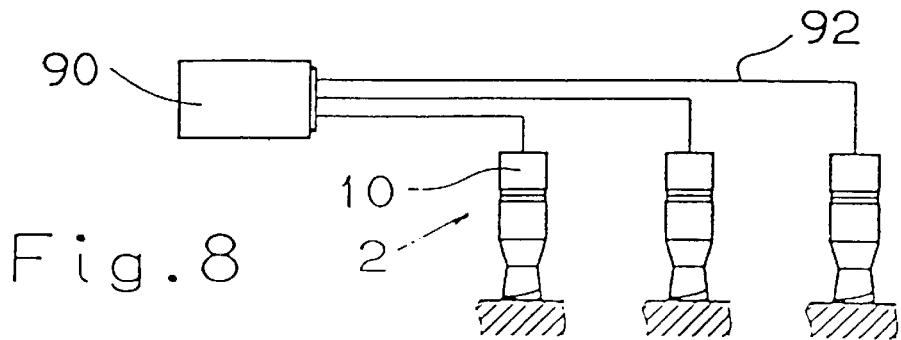
FIG. 8 shows the connection of a plurality of ultrasonic devices with an ultrasonic generator.

According to FIG. 8, a plurality of ultrasonic transmitting devices 2 can be driven by a shared ultrasonic generator 90 via lines 92.

I claim:

1. Ultrasonic device for cutting a meltable textile web (6) and simultaneously heat-sealing the cut edges, with a cutting knife (12) which works together with an anvil (14) by means of a wedge-shaped cutter (22, 22a), wherein the cutting knife (12) or the anvil (14) is connected with an ultrasonic transmitter (10), characterized in that the cutting knife (12) varies in cross section (a, b, c) along the length of the cutter (22, 22a), wherein the cutting knife (12) and/or the anvil (14) are/is adjustable in such a way that, in each case, the cross section (a, b, c) which is suitable for a determined thickness ($D, D_1, D_2, D_3$) of the textile web (6) is used.

2. Ultrasonic device according to claim 1, characterized in that the cutter (22a) has curved lateral surfaces (66a) viewed over the cross section.

3. Ultrasonic device according to claim 1, characterized in that the cutter (22) has straight lateral surfaces (66) viewed over the cross section.

4. Ultrasonic device according to one of claims 1 to 3, characterized in that the cutter (22, 22a) has a sharp-edged cutting edge.

5. Ultrasonic device according to one of claims 1 to 3, characterized in that the cutter (22, 22a) has a blunt cutting edge (24) of width (x) which is preferably constant over the entire length of the cutting edge (24).

6. Ultrasonic device according to claim 1, characterized in that a wedge angle ($\alpha, \alpha_1, \alpha_2, \alpha_3$) is preferably between 0° and 160°, the cutter (22, 22a) is smaller for thicker textile web portions (B, C) and is larger for thinner textile web portions (A, B).

7. Ultrasonic device according to claim 1, characterized in that the cutting knife has a straight cutting edge and cooperates with a curved anvil which are movable back and forth relative to one another along the cutting edge.

8. Ultrasonic device according to claim 1, characterized in that the cutting knife (12) has at least one cutting edge (24) which is curved corresponding to a circle segment, wherein the cutting knife (12) is arranged so as to be rotatable around the center axis (26) of the circle segment.

9. Ultrasonic device according to claim 1, characterized in that the anvil (14) is constructed as a rotatable cylinder (16) over which the textile web (6) is guided.

10. Ultrasonic device according to claim 1, characterized in that the anvil is provided with an ultrasonic transmitter.

11. Ultrasonic device according to claim 1, characterized in that the ultrasonic transmitter (10) oscillates at 15 to 100 kHz and is preferably constructed as a magnetic or piezo-electric transducer.

12. Ultrasonic device according to claim 1, characterized in that the ultrasonic transmitter (10) with the cutting knife (12) is arranged at a holder (32) by means of a slide (28) which is displaceable in a feed direction (30) relative to the anvil (14) and can be pretensioned relative to the anvil (14) by means of an adjustable pretensioning device (36), preferably a helical spring (38).

13. Ultrasonic device according to claim 1, characterized in that the holder (32) is fastened to a bar (44) which is arranged so as to be swivelable about a center axis (26).

14. Ultrasonic device according to claim 1, characterized in that it has an adjusting motor (56) for adjusting a relative position between the cutting knife (12) and anvil (14), wherein the adjusting motor (56) is connected with a control device (60) which controls the adjusting motor (56) depending on a feeler (62) which senses the textile web (6) or depending on a control program for producing the textile web (6).

15. Ultrasonic device according to claim 1, characterized in that it is arranged at a weaving machine (8) for producing label ribbons (4) from a broad woven fabric (6), wherein an ultrasonic device (2) is arranged between every woven in label ribbon (4) for cutting the broad woven fabric (6).

16. Ultrasonic device according to claim 15, characterized in that it is arranged in front of a thermofixing device (82) of the weaving machine (8).

17. Ultrasonic device according to claim 15 or 16, characterized in that it is arranged in front of the fabric take-off device (18) of the weaving machine (8).

* * * * *